United States Patent
Theimer et al.

(10) Patent No.: US 7,640,253 B2
(45) Date of Patent: *Dec. 29, 2009

(54) METHOD AND SYSTEM FOR MANAGING DATA RECORDS ON A COMPUTER NETWORK

(76) Inventors: Marvin M. Theimer, 4440 137$^{th}$ Ave. SE., Bellevue, WA (US) 98006; Michael B. Jones, 17259 NE. 36$^{th}$ St., Redmond, WA (US) 98052

( * ) Notice: Subject to any disclaimer, the term of this patent is extended or adjusted under 35 U.S.C. 154(b) by 690 days.

This patent is subject to a terminal disclaimer.

(21) Appl. No.: 11/063,140

(22) Filed: Feb. 22, 2005

(65) Prior Publication Data

US 2005/0154768 A1 Jul. 14, 2005

Related U.S. Application Data

(63) Continuation of application No. 10/107,287, filed on Mar. 27, 2002, now Pat. No. 7,096,228.

(51) Int. Cl.
G06F 17/30 (2006.01)

(52) U.S. Cl. .................... 707/100; 707/10; 707/201

(58) Field of Classification Search ............... 707/10, 707/100–103, 2–5, 201; 709/203
See application file for complete search history.

(56) References Cited

U.S. PATENT DOCUMENTS

| | | | |
|---|---|---|---|
| 5,331,637 A | 7/1994 | Francis et al. | |
| 5,355,371 A | 10/1994 | Auerbach et al. | |
| 5,721,914 A | 2/1998 | DeVries | |
| 5,805,824 A | 9/1998 | Kappe | |
| 5,831,975 A | 11/1998 | Chen et al. | |
| 5,935,206 A | 8/1999 | Dixon et al. | |
| 6,014,686 A | 1/2000 | Elnozahy et al. | |
| 6,081,840 A * | 6/2000 | Zhao | 709/224 |
| 6,167,427 A | 12/2000 | Rabinovich et al. | |
| 6,256,675 B1 | 7/2001 | Rabinovich | |
| 6,269,080 B1 | 7/2001 | Kumar | |
| 6,505,254 B1 | 1/2003 | Johnson et al. | |
| 6,553,413 B1 | 4/2003 | Leighton et al. | |
| 6,584,075 B1 | 6/2003 | Gupta et al. | |
| 6,735,200 B1 | 5/2004 | Novaes | |
| 6,771,593 B2 | 8/2004 | Popovich | |
| 6,857,012 B2 * | 2/2005 | Sim et al. | 709/222 |
| 7,120,690 B1 * | 10/2006 | Krishnan et al. | 709/225 |

(Continued)

OTHER PUBLICATIONS

Ratnasamy, et al., "Application-level Multicast Using Content-Addressable Networks," *Proceedings of Third International Workshop on Networked Group Communication* (NGC '01), 12 pgs (2001), printed at http://citeseer.ist.psu.edu/ratnasamy01applicationlevel.html.

(Continued)

*Primary Examiner*—Cheryl Lewis
(74) *Attorney, Agent, or Firm*—Wolf, Greenfield & Sacks, P.C.

(57) ABSTRACT

A method and system for managing data records on a computer network is described, in which copies of data records are distributed among various servers in a hierarchical tree structure, and in which servers that experience an excessive number of requests for a particular data record transmit replicas of that data record to other servers to distribute the load.

20 Claims, 8 Drawing Sheets

U.S. PATENT DOCUMENTS

| | | | |
|---|---|---|---|
| 7,567,504 | B2 | 7/2009 | Darling |
| 7,590,989 | B2 | 9/2009 | Yim |
| 2002/0010798 | A1 | 1/2002 | Ben-Shaul et al. |
| 2002/0032672 | A1* | 3/2002 | Keith, Jr. .................... 707/2 |
| 2002/0078174 | A1 | 6/2002 | Sim et al. |
| 2002/0124082 | A1* | 9/2002 | San Andres et al. ......... 709/225 |
| 2002/0133491 | A1 | 9/2002 | Sim et al. |
| 2003/0023505 | A1 | 1/2003 | Eglen et al. |
| 2004/0010616 | A1* | 1/2004 | McCanne .................. 709/238 |
| 2005/0108071 | A1 | 5/2005 | Jain |
| 2006/0233106 | A1 | 10/2006 | Achlioptas |
| 2007/0294754 | A1 | 12/2007 | Finkelstein |
| 2008/0209273 | A1 | 8/2008 | Bahl |
| 2008/0320003 | A1 | 12/2008 | Heinson |
| 2009/0086640 | A1 | 4/2009 | Zhang |
| 2009/0086741 | A1 | 4/2009 | Zhang |
| 2009/0089438 | A1 | 4/2009 | Agarwal |
| 2009/0222553 | A1 | 9/2009 | Qian |

OTHER PUBLICATIONS

Ratnasamy et al., *A Scalable Content-Addressable Network*; Dept. of Electrical Eng. & Comp Sci., University of California, Berkeley and ACIRI, AT&T Center for Internet Research at ICSI, pp. 161-171(Aug. 27-31, 2001), Berkeley,CA USA.

Rowstron et al., *Pastry: Scalable, decentralized object location and routing for large-scale peer-to-peer systems*, Proc. of the 18th IFIP/ACM International Conference Distributed Systems Platforms, pp. 1-22, (Middleware 2001). Heidelberg, Germany, Nov. 2001.

Rowstron et al., *Scribe: The design of a large-scale event notification infrastructure*, Proceedings of 3d International Workshop on Networked Group Communications, pp. 1-13; (2001).UCL, London, UK.

Rowstron et al., *Storage management and caching in Past, a large-scale, persistent peer-to-peer storage utility*, SOSP-18, pp. 1-13, (Nov. 2001) Canada.

Stoica et al., *Chord: A Scalable Peer-to-Peer Lookup Service For Internet Applications*, MIT Laboratory for Computer Science, pp. 149-160, (Aug. 27-31, 2001).

Zhao et al., *Tapestry: An Infrastructure for Fault-tolerant Wide-area Location and Routing*, Computer Science Division, University of Berkeley, Report No. UCB/CSD-01-1141, Berkeley, California, pp. 1-27; (Apr. 2001).

Zhuang et al., *Bayeux: An Architecture for Scalable and Fault-tolerant Wide-area Data Dissemination*, Eleventh International Workshop on Network and Operating Systems Support for Digital Audio and Video, pp. 1-9, (Jun. 2001) Port Jefferson, New York.

Chankhunthod et al,. *A Hierarchical Internet Object Cache*, Proceedings of the USENIX 1996 Annual Technical Conference pp. 153-163, (1990) Berkeley CA.

Partial Search Report dated May 29, 2007 from European Application No. 03006146.9.

* cited by examiner

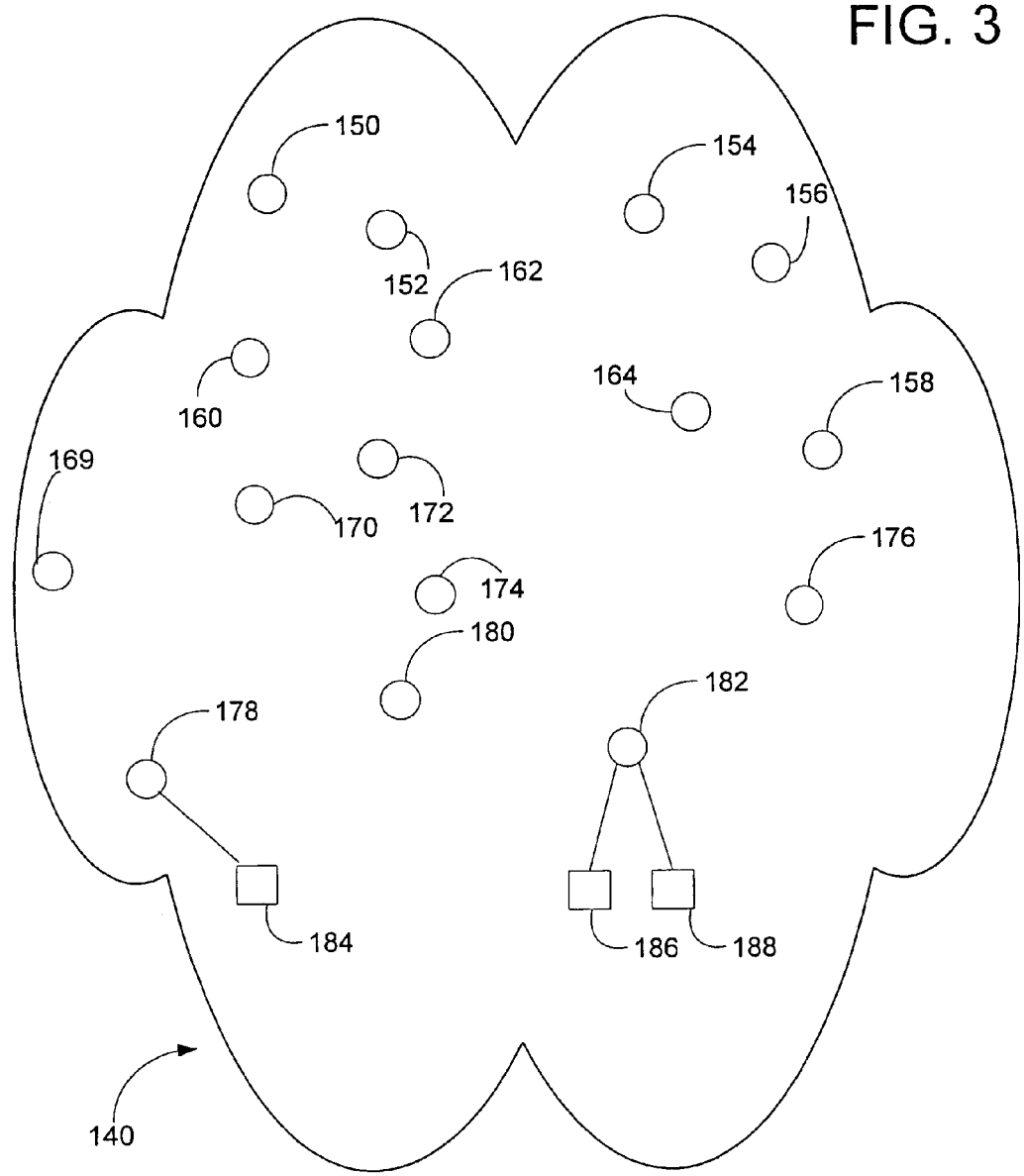

FIG. 6

NodeId 10233102

| Leaf set | | SMALLER | | LARGER | |
|---|---|---|---|---|---|
| 10233033 | | 10233021 | | 10233120 | 10233122 |

Routing table — column 0, column 1, column 2, column 3

| | column 0 | column 1 | column 2 | column 3 |
|---|---|---|---|---|
| row 0 | -0-2212102 | 1 | -2-2301203 | -3-1203203 |
| row 1 | 0 | 1-1-301233 | 1-2-230203 | 1-3-021022 |
| row 2 | 10-0-31203 | 10-1-32102 | 2 | 10-3-23302 |
| row 3 | 102-0-0230 | 102-1-1302 | 102-2-2302 | 3 |
| row 4 | 1023-0-322 | 1023-1-000 | 1023-2-121 | 3 |
| row 5 | 10233-0-01 | 1 | 10233-2-32 | |
| row 6 | 0 | | 102331-2-0 | |
| row 7 | | | 2 | |

250, 252

METHOD AND SYSTEM FOR MANAGING DATA RECORDS ON A COMPUTER NETWORK

CROSS-REFERENCE TO RELATED PATENT APPLICATIONS

This patent application is a continuation of a U.S. patent application Ser. No. 10/107,287, U.S. Pat. No. 7,096,228, filed Mar. 27, 2002, entitled "METHOD AND SYSTEM FOR MANAGING DATA RECORDS ON A COMPUTER NETWORK."

TECHNICAL FIELD

The present invention relates generally to data record management and, more particularly, to the management of the data records of a network, in which copies of the data records are organized into tree-structured logical hierarchies, and in which data records that are in high demand can be replicated to accommodate the demand.

BACKGROUND OF THE INVENTION

Name services have been in use on computer networks for many years. In general, the main function of a name service is to map a name, such as a file name, or network domain name, to some arbitrary data record, such as a file or a network address. A name service can, for example, receive a "look-up request" that includes a name, such as a textual name of a web site, from a requesting client and return information associated with the name, such as the IP address of the web site, to the requesting party. Other functions performed by a name service include mapping a name to a restricted set of data objects. For example, a computerized "white pages" name service for a telephone network might map a person's name to multiple pieces of information, such as the person's telephone number and the person's street address. One of the most popular name services in use today is the Domain Naming Service (DNS).

A name service, like other types of data management systems, may be implemented using a distributed database. That is, some or all of the data records of the name service may be distributed and stored in multiple locations throughout a network. In such a name service, there will often be multiple copies, or "replicas" of any given data record. One challenge that exists in implementing a name service in this manner is providing timely updates to the various replicas of a data record. Another challenge is dealing with so called "flash-crowds." A flash-crowd is a large number of users who suddenly become interested in a single name or limited set of names administered by the name service and subsequently lose interest after a relatively short period of time. In the context of the DNS and the Internet, for example, a flash-crowd forms when a website suddenly becomes popular, and many users are suddenly and simultaneously entering the domain name of the website (e.g. www.foo.com), thereby causing numerous requests for the IP address of www.foo.com to be sent to DNS servers. A flash-crowd can disrupt name services such as DNS because only a relative few of the name servers on a network will actually have the information required by the flash crowd and will thus be overwhelmed.

SUMMARY OF THE INVENTION

The invention is generally directed to a method and system for managing data records on a computer network, in which copies of data records are distributed among various servers in a hierarchical tree structure, and in which servers that experience an excessive number of requests for a particular data record transmit replicas of that data record to other servers to distribute the load.

According to an embodiment of the invention, network names are organized and stored in data records, referred to as "directories," according to their subject matter. Responsibility for maintaining copies of each of the directories is distributed among the servers, which are implemented as name servers.

In various embodiments of the invention, the servers communicate via an overlay network. In other words, the servers are organized into a routing topology that operates on top of an existing routing topology, such as a conventional IP-routing topology. The servers can dynamically create and destroy copies of data records.

According to various embodiments of the invention, copies of a particular data record are logically organized into a hierarchical tree structure to allow for fast updates of the copies. Additionally, copies are stored along routes of an overlay network topology that lead to the master copy of the data record to minimize the number of forwards needed for a look-up request to reach a name server having a copy of the data record (either the master copy or a child copy).

According to an embodiment of the invention, servers of the network communicate via an overlay routing topology in which each server has a substantially unique number associated with it, referred to herein as a Node ID. Responsibility for maintaining the information for a particular data record is determined by calculating a hash of the data record's name and assigning responsibility for that data record to the server whose Node ID is the closest to the calculated hash. This helps ensure that responsibility for the various data records is evenly distributed among the various servers. In this embodiment, when a client computer on the network requires information from one of the data records, it sends a request for the look-up to one of the servers. The request includes a key number associated with the data record. The key number is derived from the name of the data record itself. The server receiving the request then determines whether it has a copy of the data record containing the information that is the subject of the look-up request. If it does not have a copy of the data record, it routes the request towards the server that has responsibility for the requested data record. This routing may involve forwarding the request through multiple intermediary servers. Each of these intermediary servers checks to see if it has a copy of the requested data record. If so, then it responds to the request. Otherwise, it continues forwarding the request. The request will continue to be forwarded from server to server until it eventually reaches a server with a copy of the requested data record (which will respond to the request), or until it reaches the server that is responsible for maintaining the master copy of the data record (which will likewise respond to the request).

According to various embodiments of the invention, when a server detects that the number of requests for information from a particular data record has exceeded a threshold level, the server pushes a copy of that data record out to another server that lies in a path along which the largest number of requests for information from that data record have been received. The server can repeat this process as many times as necessary to accommodate the increase in demand. The threshold level may be static or may change according to changing network conditions According to various embodiments of the invention, a server that receives a look-up request from a client computer measures the amount of time that elapses between the time that it forwards the request on to the next server and the time that it receives a response to the request. If the time that has elapsed is sufficiently large, then the server generates a request for a copy of the data record containing the information that is the subject of the look-up request and stores it locally. This helps compensate for communication bottlenecks that may occur at various points in the network.

In still further embodiments of the invention, updates to a data record get routed to the master copy of the data record. The server maintaining the master copy executes the update and then forwards the update request to all child copies it has created of the data record. These apply the update and then, in turn, forward the update to all their child copies. This continues until the update has been forwarded to all copies of the data record in which it is to be applied.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 shows an example of a computer network that includes servers on which the invention may be implemented;

FIG. 6 shows examples of data structures that may be used in an embodiment of the invention.

DETAILED DESCRIPTION OF THE INVENTION

Prior to proceeding with a description of the various embodiments of the invention, a description of the computer and networking environment in which various embodiments of the invention may be practiced will be provided. Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers. Accordingly, the terms "computer," "client," and "server" as used herein include personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
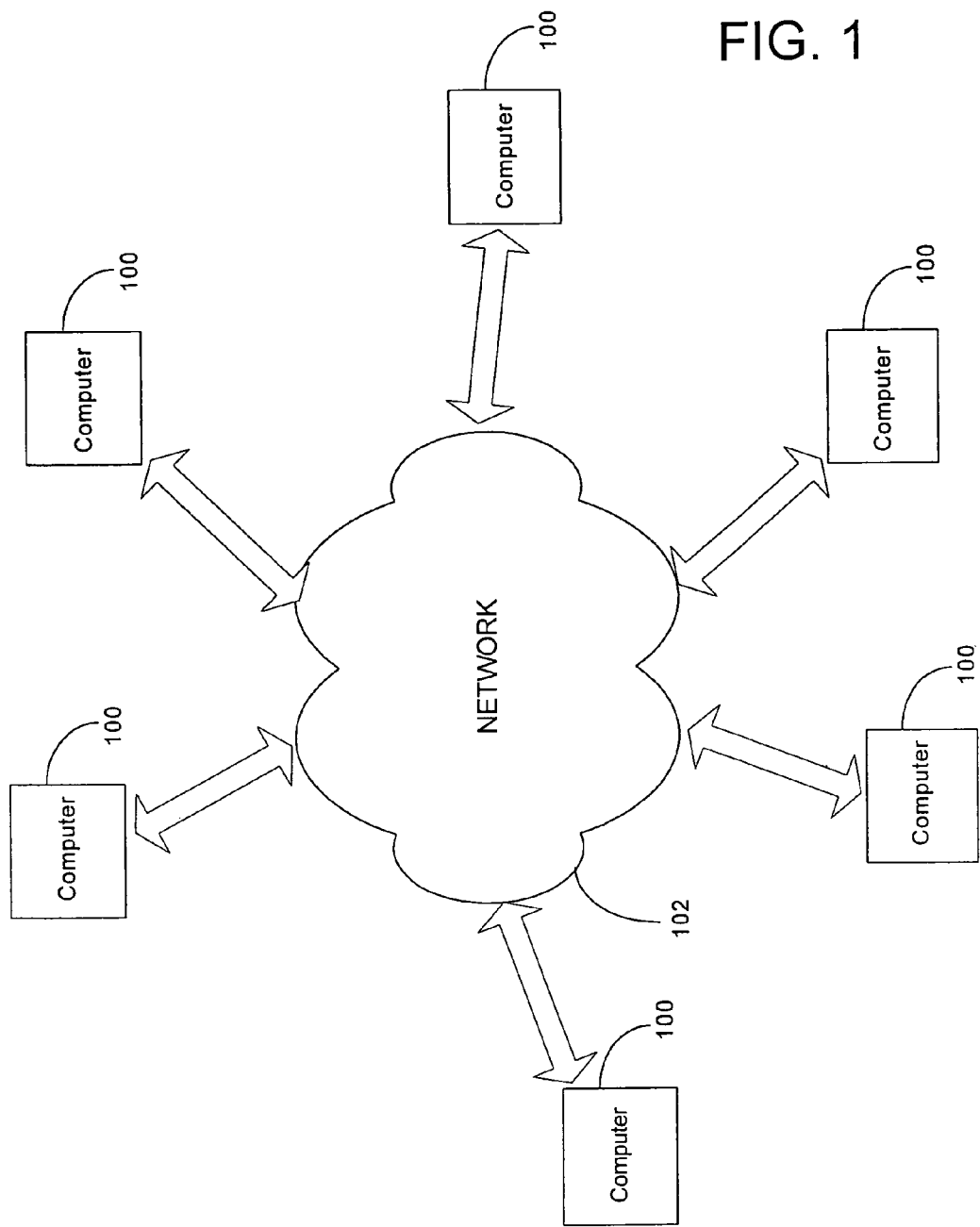
FIG. 1 shows an example of a computer network in which the invention may be practiced.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
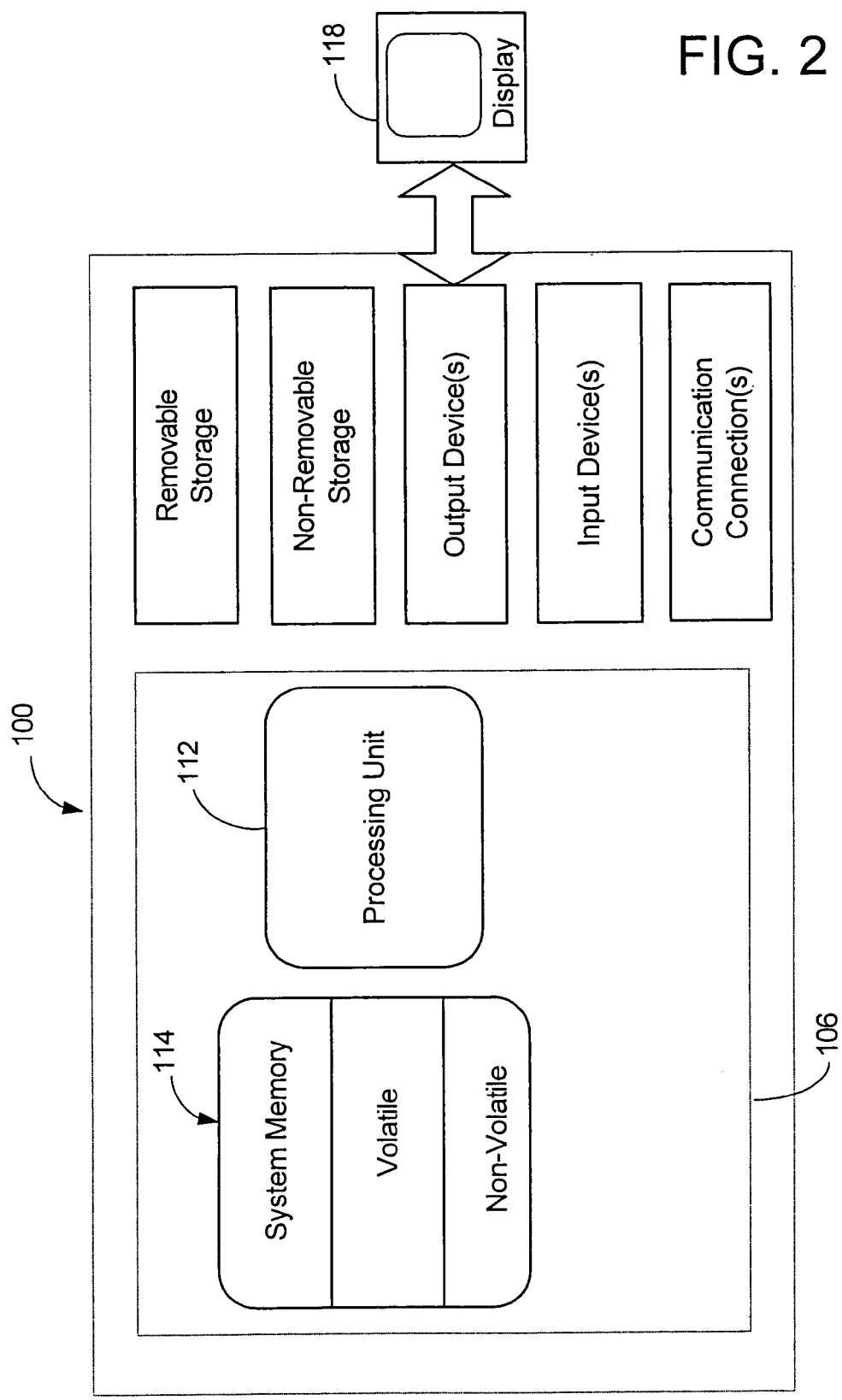
FIG. 2 shows an example of a computer on which at least some parts of the invention may be implemented.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

The operation of the invention according to various embodiments will now be discussed in the context of a network 140, shown in FIG. 3, that includes a plurality of servers, shown with reference numerals 150-182, and a plurality of client computers, shown with reference numerals 184-188. The servers 150-182 maintain data records on the network 140. In the examples that are contained herein, the client computers 184-188 request information from the one or more of the servers 150-182. However, it is understood that the client computers themselves may also act as servers in some embodiments. Thus, the term "client computer" as used in this context is meant to convey the fact that the computers 184-188 rely on the servers 150-182 for access to the data records, and is not meant to limit implementation of the computers 184-188 as permanent clients. Indeed, the client computers 184-188 may, in fact, be peers of the servers 150-182 or even act as servers to the servers 150-182 for other functions.

The servers 150-182 are responsible for maintaining a database of names and data records associated with each of the names. The database is distributed—that is, different parts of it are stored on different computer-readable media located throughout the network 140. In some embodiments of the invention, the database is organized by subject matter into directories. For example, the server 150 might be responsible for storing and maintaining a directory of network names under the subject heading "Automobile companies," which may include network addresses of websites for all of the major automobile companies. In other embodiments of the invention, data records are not organized into directories, but are stored, maintained and replicated individually. In general, the terms "record" and "data record" as used herein refer to a data structure that has some name or label, and in which some data associated with the name or label is stored. The term "directory" as used herein refers to a particular type of data record that contains other data records and acts as an organizational unit for those other data records.

In accordance with various embodiments of the invention, the servers 150-182 all operate in the context of an overlay network. That is, there is a routing topology among the servers that exits and operates on top of an underlying routing topology (e.g. IP routing). There are a variety of possible overlay topologies that may be used. These overlay topologies include, among others: PASTRY, described in the Proceeding of the 18$^{th}$ IFIP/ACM International Conference on Distributed Systems Platforms (November 2001); Content Addressable Network (CAN) and CHORD, which were both described in the proceedings of SIG COMM'01, Aug. 27-31, 2001; and TAPESTRY, described in Report No. UCB/CSD-01-1141, published by the University of California at Berkeley.

For each data record of the network 140, there is at least one server that has a copy of the record. When a computer in the network 140 needs to have a look-up performed, it submits a look-up request to one of the servers 150-182. The server receiving the request first determines whether it has a copy of the data record that has the information that is the subject to the request (i.e. has access to a computer-readable medium on which a copy of the data record is stored). If it does, it responds to the request by providing information from the data record (e.g. if the name is a network name, it might respond with the corresponding IP address). If it does not, then the server forwards the request according to forwarding algorithms of an overlay routing program that executes on the server. The overlay routing program chooses the forwarding destination based on its knowledge of other servers and its determination of which of those known servers is logically "closer" to the server that has the correct data record. The overlay routing program's notion of which servers are logically "closer" to the appropriate destination server depends on which overlay routing topology is being used.

Figure 3A:
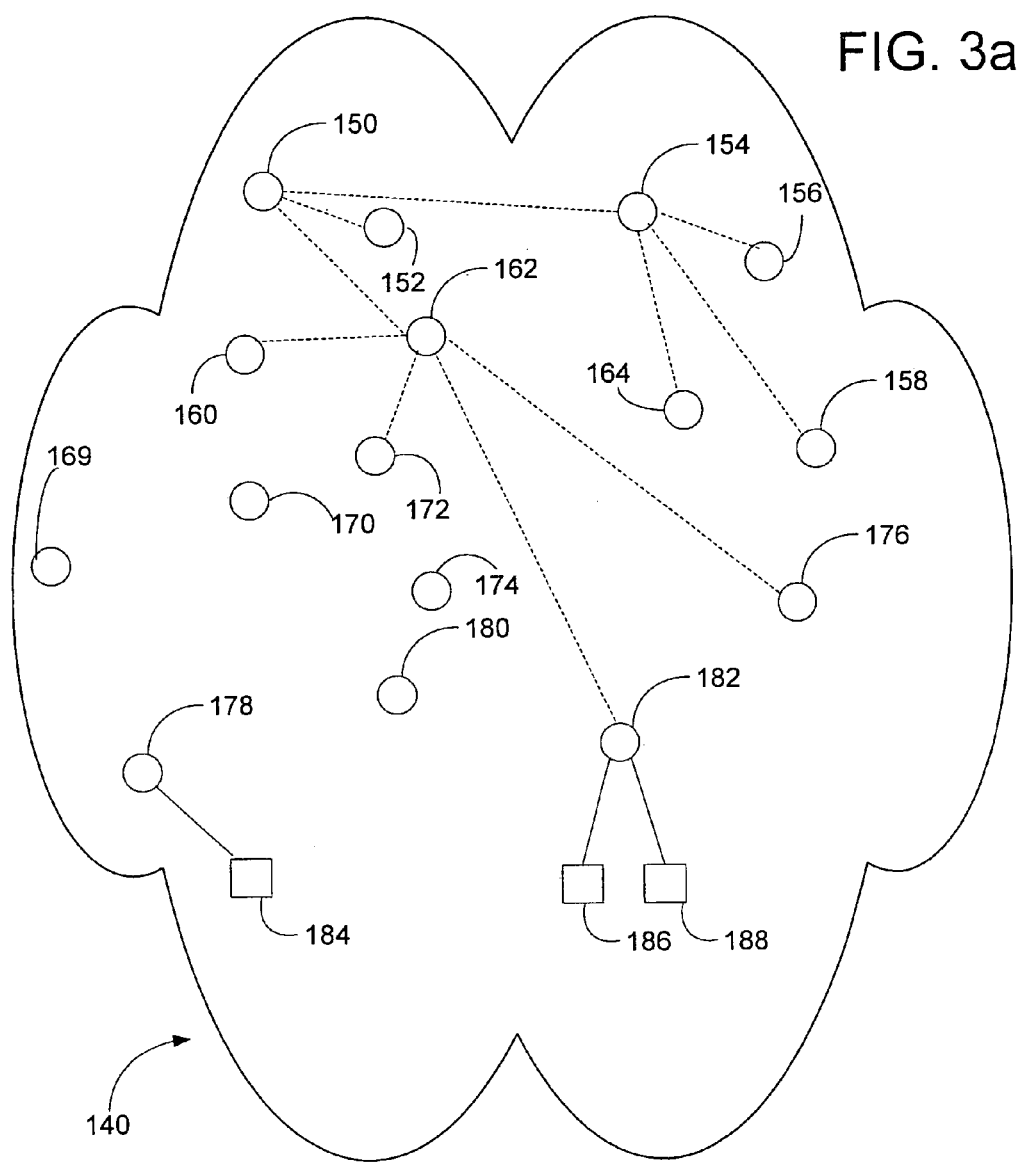
FIG. 3a shows an example of a tree structure into which those servers of FIG. 3 that have a copy of a directory hosted at node 150 may be logically organized.

The result of this forwarding scheme is that, for each data record, a subset of the servers (or possibly all of the servers) form a hierarchy based on how logically "close" they are to a server that has a copy of the data record. For example, FIG. 3a shows how the server 150, which stores and maintains a copy of the network address directory called "Automobile Companies," might relate to some of the other servers of the network in terms of logical "closeness." In this example, two acts of forwarding are required for a request for information contained in the "Automobile Companies" directory to travel from the server 182 to the server 150, while only one forwarding step is required to get the same request from the server 154 to the server 150. In general, this virtual hierarchy may be dynamically rearranged in response to changing network conditions, such as node or link failures.

A more specific embodiment of the invention will now be described, in which the overlay routing topology is implemented according to PASTRY. Referring again to FIG. 3, each server in the network 140 has a unique identifier, referred to herein as a Node ID. Although the Node ID can be any length, it is assumed in the examples contained herein that each Node ID is a 128-bit number. The Node ID numbering system wraps around on itself. In other words, when 128-bit numbers are used, the ordering of the Node IDs goes from zero to $2^{128}-1$, and then starts again at zero.

When a new server joins the network 140, a random Node ID is calculated and assigned to it. There are a variety of ways of calculating a Node ID. In some embodiments, the Node ID is calculated as a cryptographic hash of the server's public key and its IP address. Each message sent back and forth among the servers of the network 140 includes a key number that identifies the data record in which the information required to respond to the lookup request is located. The key number is calculated as a hash of the data record name, and is taken from the Node ID numbering system used by the servers.

When a server of the network 140 receives a message, which may include such things as a request for a name lookup or a request for a copy of a particular data record and the key number associated with the data record, the server determines whether it has a copy of the data record needed to service the request. If it determines that it does not have a copy of the data record, it compares the key number with the Node IDs of other servers of which it is aware, and determines which of those Node IDs has a value that is closest to that of the key number, either in terms of value or in terms of shared digits. The server then sends the message to the server having that Node ID.

Referring to the flowchart of FIG. 4, an example of how a server determines whether and where to forward a request according to an embodiment of the invention will now be described. In this description, the server executing the procedure will be referred to as the "first server," while the server to which the message is forwarded will be referred to as the "second server." It is assumed in this description that the name server maintains a list of "leaf nodes," which are a set of other servers who are logically closest, in terms of the overlay routing topology to that of the first server, as compared to all of the other servers belonging to the network. The total number of leaf nodes is represented hereinafter by the letter L.

At step 200, the first server receives a request that includes a key number of a data record. At step 202, the first server determines whether it has a copy of the data record that is associated with the key number. If it does, then the process continues to step 204. At step 204 the first server processes the request itself. At step 206, the first server determines whether it knows of a second server in its leaf set whose Node ID is closer to the key number than the first server's. If so, the first server sends the request to the second server at step 212. Otherwise the procedure continues at step 208. At step 208, the first server determines whether it knows about a second server whose Node ID shares with the key number a prefix that is at least one digit larger than the prefix shared with the first server. If so, then the procedure continues to step 212, the first server sends the request to the second server. If not, then the procedure continues to step 210. At step 210, the first server chooses a second server whose Node ID shares with the key number a prefix that has the same number of digits as the prefix shared with the first server's Node ID and is closer in value than first server's Node ID to the key number. According to this embodiment, the procedure outlined in FIG. 4 will succeed, unless there is a simultaneous failure of at least L/2 servers who (a) are immediate neighbors of the first server, and (b) have Node IDs are between the first server's Node ID and the key number.

An example of how network names are translated into network addresses according to an embodiment of the invention will now be described. Referring again to FIG. 3, it is assumed that each of the servers of the network 140 is a name server implementing a name service, and that the server 156 is responsible for hosting the master copy of a directory whose name is "Computers," and which contains multiple data records, each data record mapping a textual name of a site on the network, such as a web site, which has information regarding computers. The "Computers" directory may also contain names of subdirectories that pertain to computers, such as "Computers—reviews" or "Computers—manufacturers." It is assumed in this example that the "Computers" directory includes the data record that maps the name "ACME Computers" to the IP address of the ACME Computers website.

Figure 5:
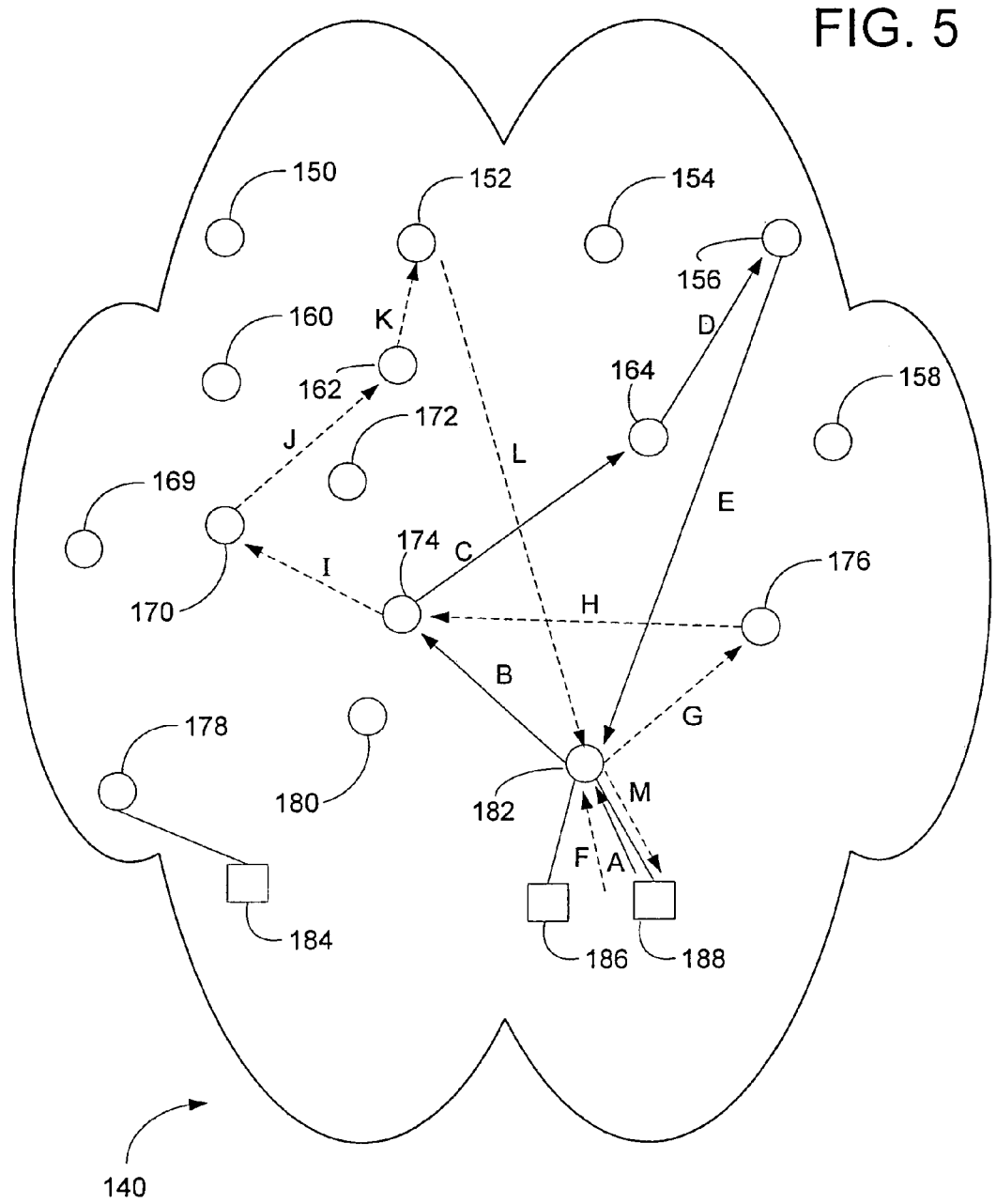
FIG. 5 shows examples of how messages may be routed among multiple servers according to an embodiment of the invention.

Referring to FIG. 5, the client computer 188 makes a request for the IP address of "ACME Computers." In forming the request, the client computer 188 generates a key number based on a hash of the text name of the directory—"Computers." The request, which includes the key number, the directory name "Computers," and the network name "ACME Computers." is transmitted by the client computer 188 to the name server 182 (Arrow A). Note that a client can send the request to any of the servers. Preferably, the client sends the request to the physically closest server to minimize the communication cost. According to one embodiment, some or all of the servers register themselves under a well-known name in DNS and the client locates an appropriate server via a DNS lookup.

Figure 4:
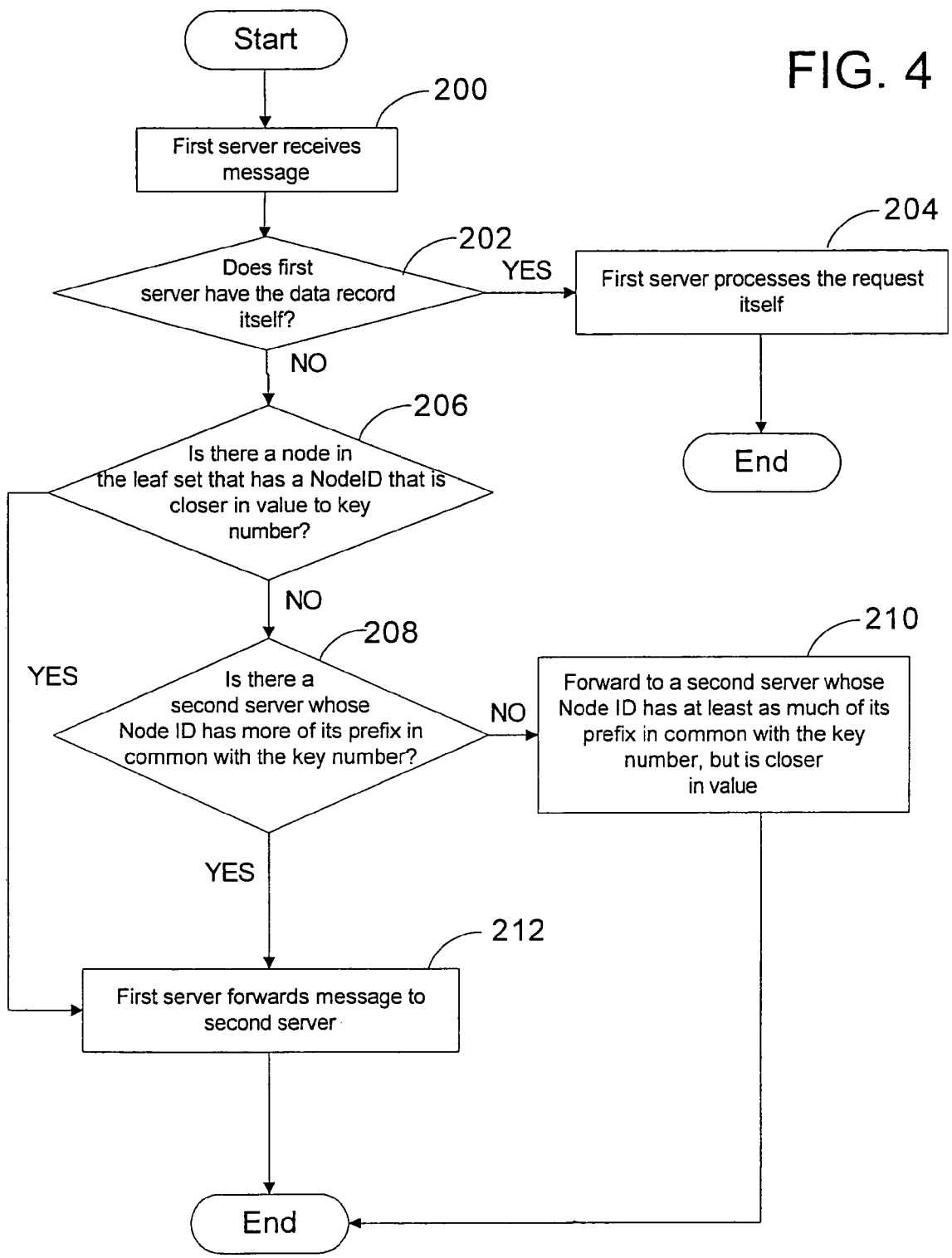
FIG. 4 shows an example of a procedure that may be followed by a server operating according to an embodiment of the invention.

Continuing with the example, the server 182 executes the procedure described in conjunction with FIG. 4, and determines that the request should be sent to the server 174. The server 182 therefore forwards the request to the server 174 (Arrow B). In this example implementation, each time a server forwards the request to the next server, it annotates the request with its own IP address as the "last forwarder". Thus, by the time the request reaches its intended destination, it includes a history of the address of the original server that received the request (server 182, in this example) and the "last for warder" address, which is used for determining where to send a replica of a directory if needed.

Continuing with the example, the node 174 receives the request and also executes the procedure described in conjunction with FIG. 4, and determines that the next server to which the request should be sent is the server 164. The server 174 therefore sends the request to the server 164 (Arrow C). The server 164 repeats this process and passes the request to the server 156 (Arrow D). The server 156 executes the procedure of FIG. 4 and determines that it has the correct directory. The server 156 locates the directory "Computers" as well as the entry in that directory containing the IP address of "ACME computers" in a memory to which it has access, and, using the travel history included with the request, the server 156 discovers that the server 182 was the first server node to forward the request, and therefore transmits a response to the request to the server 182 using the underlying IP routing architecture of the network 140 (Arrow E). The response includes the IP address of "ACME Computers." The server 182 then provides the IP address of "ACME Computers" to the client computer 188.

According to an embodiment of the invention, each server of a network is capable of making copies of data records that it hosts, and sending the copies to other servers. For ease of reference, the copy of the data record that is maintained by the server that hosts the data record will be referred to as the "master" copy. Thus, the copies sent to other servers are replicas of the master copy. Sending copies of a data record to other servers helps a server to distribute its load. When there are multiple copies of a data record, each server having a copy maintains a link to the "parent" copy of the data record, and maintains links to any "child" copies that it previously sent to other servers. These links are used to propagate updates to the various copies of the data record. Thus, those servers of the network that maintain copies of a particular data record form a virtual tree hierarchy with respect to one another, with the server that hosts the master copy of the data record acting as the "root" of the tree. The result of this scheme is that, for each data record that is being maintained on the network, there may be a distinct tree of servers. Trees of servers for different data records may, however, overlap and even be made of the same set of servers. It is to be noted that the hierarchical tree formed by a set of servers that is tasked with maintaining copies of a particular data record is not necessarily the same "tree" that is formed by any overlay routing topology used by the network.

Each server in this embodiment has a threshold request rate. The threshold request rate may be a relatively static value preset by, for example, a systems administrator, or be a dynamic value, such as a value that is a function of such things as the time of day, current server load, current network load or some combination thereof. If the number of requests being received by the server for a particular data record exceeds the threshold request rate, the server responds by pushing out copies of that data record to one or more of the other servers of which it is aware, and typically prefers servers from which the most requests for a look-up for the particular data record have been received. Furthermore, each server that receives a copy of a data record from another server is capable of deleting the copy whenever it determines that the rate of the requests it receives for entries in the copied data record falls below a certain threshold level. This ability to push out copies during periods of high demand and to delete copies during periods of low demand helps the name service deal with so-called "flash crowds" that often appear on networks. For example, in late 2001, the country of Afghanistan suddenly caught the interest of Internet users around the world, thereby increasing the number of IP address look-ups for Afghanistan-related web sites.

According to an embodiment of the invention, each server in a network determines whether or not to replicate of one of its data records based on the rate at which it receives requests for information that resides in that data record. Once that rate exceeds a threshold value, the server pushes a copy of the data record out to another server of which it is aware. To determine which of the other servers is to receive the copy, the server that is doing the copying (the local server) compares the rate at which requests for the entry are being received from each of the other servers of which it is aware. The local server then chooses (from those other servers that don't already have a copy of the data record) the server from which requests for info from that data record are being received at the highest rate. This ensures that the copy being made by the local server will be located along a path through which requests for information from that data record are likely to be routed. The server determines the origin of each request by analyzing the "last forwarder information" contained in the request.

Figure 7:
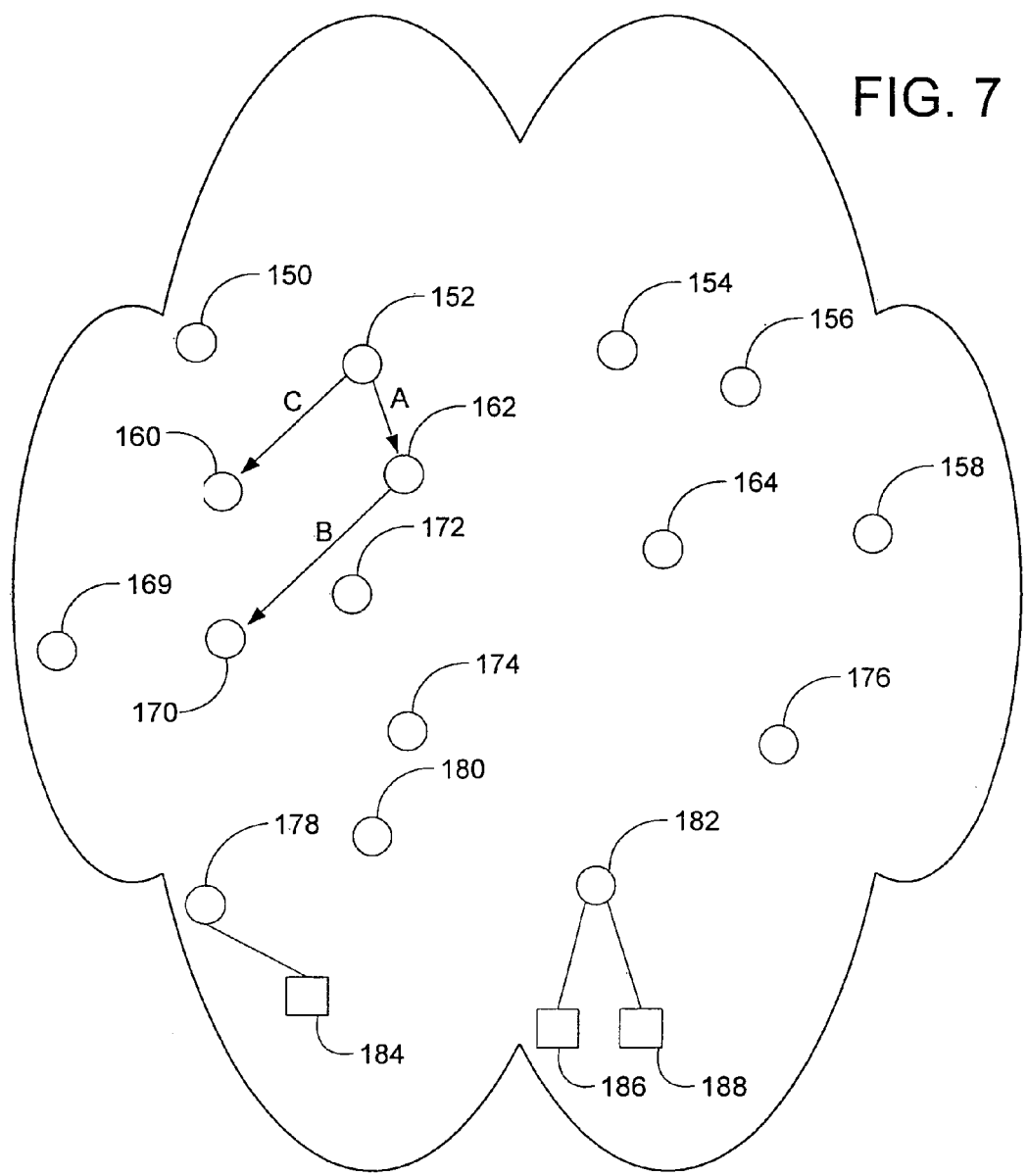
FIG. 7 shows an example of how copies of a data record may be created according to an embodiment of the invention.

Referring to FIG. 7, an example of how replication is accomplished in accordance with an embodiment of the invention is shown. In this example, the servers of the network 140 are assumed to be name servers that implement a name service. Server 152 is assumed to have received requests for the directory from four other servers: server 150, server 160, server 162 and server 154. Similarly, the server 162 is assumed to have received requests for the directory from four other servers: server 170, server 172, server 174 and server 164. In this example, the server 152 hosts the directory "Investing—News," which includes entries that map text names of investment news websites to their IP addresses. Thus, the server 152 maintains the master copy of the "Investing—News" directory. In this example, the company HighFlyer.com announces that it will have an initial public offering of stock. The server 152 is configured so that if it receives 500 requests per hour or more for a particular directory, it replicates the directory. On the day that HighFlyer.com announces its public offering, the server 152 receives 1,500 lookup requests for web site names that are located in the "Investing—News" directory. It determines that, of those requests, 800 came from the server 162, 400 came from the server 160, 275 came from the server 150, and 25 came from the server 154. Since the server 162 had the highest rate of requests, the host server, server 162, replicates the directory "Investing—News" and pushes a copy of the directory out to the server 162 (arrow A).

Assuming that the server 162 is also configured to replicate those directories for which more than 500 requests per hour have been received, the server 162 may soon experience the same overloading problem. For example, if during the following hour, server 162 receives 800 lookup requests names whose entries are listed in the "Investing—News" directory, it will make the decision to replicate its copy of the directory. If, for example, it receives 410 of those requests from the server 170 and 130 of those requests each from the servers 172, 174 and 164, the server 162 pushes a copy of the directory out to the server 170 (arrow B). During the same hour, the server 152 receives 700 look-up requests entries in the directory "Investing—News," four hundred of which are coming through the server 160, 200 of which are coming through the server 150 and 100 of which are coming through the server 154. In response, the server 152 pushes out a copy of the entry to the server 160 (arrow C).

When experiencing sustained high load conditions from all over for a particular data record, a server eventually replicates that data record along all of the incoming forwarding paths to it. Once there is a copy of the data record along each of the incoming forwarding paths of the overlay topology, the server will stop receiving forwarded requests, and will end up servicing only those requests that it receives directly from clients. For an extremely popular data record, every server in the network may eventually possess a copy of it. In such a case, each server will only need to service requests to it from directly connected clients, and not have to process requests forwarded from other servers.

In various embodiments of the invention, servers will discard a copy of a data record when the request rate for information from it falls below a certain lower threshold. To discard a given copy of a data record, a server informs the server having the "parent" copy of the data record (the server from which the copy of the data record was received) and informs the servers having "child" copies of the data record (servers to which it has sent a copy of the data record). The servers having child copies are informed that their new parent is the server having the parent copy. Similarly, the server having the parent copy is told (by the server that is deleting its copy) to add the servers having the child copies to its own child replicas list for a given data record.

For example, if the server 162 in FIG. 7 determines that it should delete its copy of a directory "Investing—News," it informs the server having the parent copy, the server 152, and gives server 152 the identity of all the servers having child copies of the directory. In this case, there is only one—the server 170. The server 152 then "adopts" the server 170 with respect to that directory. The server 162 also informs the server 170 of this fact.

In addition to load on individual servers, another limitation on the overall capacity of a data record service is network congestion. One place in which network congestion can occur is on the network links interconnecting the servers. To compensate for network congestion, according to an embodiment of the invention, servers that are receiving lookup requests directly from client computers measure the round-trip times for requests that they pass onto other servers. In other words, when a server receives a lookup request from a client, it measures the time that elapses from when it forwards the request to when it receives a response to the request. When roundtrip times for requests for information from a given data record are observed to be larger than a given threshold, the server (in its capacity as a proxy for the client) sends a request for a copy of the data record to the name service via the same routing path as lookup requests are sent. The threshold may be a static value or may change according to an algorithm that accounts for network and other conditions. The request travels towards the server hosting the master copy of the data record, and either reaches the host server, which responds by transmitting a copy of the data record to the requesting server, or reaches some other server that happens to have a copy of the data record, and would likewise respond by sending a copy of the data record to the requesting server. Alternatively and preferably, the requesting server sends the request for the copy directly to the server that provided the response to the original request (i.e. the server having the data record) via the network's IP routing structure. Thus, copies of a data record can be "pulled" to other names servers across congested network links, in addition to being "pushed" to other servers from overloaded nodes.

To avoid contributing to additional network congestion in an embodiment of the invention, servers acting as client proxies may also cache data records for which they observe high round-trip times. While these entries may only be cached for brief periods of time before being discarded, this form of caching can still be useful if client request rates are considerably higher than one per cache timeout period (such as when a flash crowd forms). If servers were to request copies immediately in response to high observed round-trip times, then many less popular data records might end up getting replicated as well as the popular ones creating the network congestion. This is because network congestion affects all request traffic that is being routed through congested links. To avoid this unnecessary replication in this embodiment, servers only initiate requests for copies of data records for which they themselves observe high client request rates.

In various embodiments of the invention, updates to multiple copies of a data record are, by default, applied in a weakly-consistent manner. In other words, while an update to a data record is being disseminated to multiple servers having copies of the data record, some copies will reflect the update while others have yet to receive it. In some applications, updates would be best applied in a strongly-consistent manner, so that all clients of the network would see identical views of, for example, the names administered by a name service at any given time. However, the cost of maintaining strong-consistency semantics across multiple copies may be prohibitive for the number copies that can occur for popular data records.

In an embodiment of the invention, clients in a network wishing strongly-consistent update semantics from the network name service can request them when a data record is created, but doing so will disable replication for that data record. This is generally acceptable for data records whose creators know that they will only be accessed by limited numbers of clients. The scalability limit for such data records will be determined by the ability of a single server to process requests. Modern machines are typically able to process a few thousand requests per second. Thus, in practice, all but the most popular data records could probably be declared to be strongly consistent without affecting actual client request latencies in any noticeable manner. Such data records may, however, have to forego the opportunity of ever becoming popular. Additionally, a data record may be dynamically switched between having weakly and strongly consistent update semantics. However, clients may need to account for the possibility that this can happen by checking which state a data record is in when they receive a reply to a request that they submitted. Also, when a data record is switched from weak to strong consistency semantics, all copies of the data record except for the master copy should be deleted as part of the process.

According to an embodiment of the invention, all requests for updates to a weakly-consistent data record get routed to the host server for that data record. The host server then forwards each update to all the servers having child copies of that data record. These, in turn, forward each update to their child copies, until eventually every update propagates to all of the copies of the data record. For example, referring to FIG. 5, it will be assumed that the servers of the network 140 are name servers implementing a name service. It will also be assumed that the client computer 188 is the "owner" of the address for ACME Computers (whose name service entry is maintained in the "Investing—News" directory at the server 152). If the IP address for ACME Computers has changed, the client computer 188 can transmit an "update" message to its local server 182. The update message includes the key number for the directory in which ACME Computers is located as well as the new IP address. The message then gets forwarded to the server 152 via arrows F-K, as shown in FIG. 5. The server 152 then disseminates the update to servers 160 and 162, so that these servers can update their respective copies of the directory with the changes to the ACME Computers entry. The server 162, in turn, sends the update to the server 170. Also, the server 152 sends a confirmation of the update back to the client computer 188 via arrows L and M. Alternatively, the server 152 could send the confirmation directly to the client computer 188.

In various embodiments of the invention, update messages are sent using a reliable request-response messaging protocol. As a consequence, when servers having a copy of a data record reply to update messages, the sender of the update will be informed when an update has been successfully received, in the absence of failures. A server having a copy of the data record replies to an update message after it: (1) has forwarded the update message to servers having child copies and (2) has either heard back from the servers having the child copies or those replies have timed out. Thus, after the host server for a data record hears a reply from each of the servers having the child copes for the data record or has timed out, it knows that the update has been successfully propagated to all reachable copies of the data record in the network. Assuming that servers having copies can infer when they are unreachable and take themselves out of commission, the host server, can, at that point, reply to an update request with an indication that the update has successfully propagated to all visible copies of the data record.

To enable the servers having a copy of a given data record to detect that they are unreachable according to various embodiments of the invention, the servers keep track of the last time they had heard from their parent server for that data record. If a server hasn't heard from its parent within a specified time interval, it then assumes the parent is unreachable and deletes its copy of the data record. Preferably, the host server for a data record either forward an update or sends out a "heartbeat" message to each of the servers having child copies at least once each time interval. Alternatively, a copy of a data record may be taken off-line so that the server won't use it any more to service client requests. If the server hears from its parent again, it brings the copy back on line, and asks its parent for any updates that occurred during the off-line period. This alternative implementation helps reduce recovery costs.

In various embodiments of the invention, each server in a network maintains data structures that implement an overlay network that allows it to route messages, such as look-up requests, to other servers. Examples of such data structures include a routing table, such as the routing table 250 of FIG. 6. The routing table of a server in various embodiments of the invention is organized into $\log_{2^b} N$ rows, where N is the number of servers in the overlay network, and b is a configuration parameter that is typically set at 4. Each row has $2^b-1$ entries. The rows are numbered starting with the top row, which is row 0. The entries at a given row l of the routing table each refer to a server whose Node ID prefix shares l digits (a digit contains b bits) with the prefix of Node ID of the server on which the routing table resides, which will be referred to as the "local server."

The format of each entry of the routing table in an embodiment of the invention is as follows: common prefix with first server—next digit—rest of Node ID. For example, in the routing table 250 of FIG. 6, the Node ID of the local server is 10233102. The first entry of row 0 is (NULL)—0-2212102, and represents a server whose Node ID has zero prefix digits in common with the local server's Node ID (i.e. 02212102 has no prefix digits in common with 10233102). The shaded entry (the column 2 of row 0) represents the start digit of the local server's Node ID (i.e. the "0th" position of 10233102 is 1). As another example, the third entry of row five is 10233-2-32. This represents a node whose Node ID is 10233232, which has five prefix digits in common with the Node ID of the first server (10233102).

A routing table in this embodiment of the invention is also arranged into columns according to the value of the corresponding digit of the Node ID of each node. For example, column 0 represents servers having Node ID's with zero in the place signified by the row number. Thus, row 0, column 0 contains an entry in which the Node ID is 02212102, and has a 0 in the 0th position. Row 3, column 0, in contrast, contains an entry whose Node ID is 10200230, which has a 0 in position number 3.

To enable proper routing using the routing table just described, each server of a network maintains a leaf set L. The leaf set L represents servers whose Node IDs are numerically closest to that of the local server. Note that these are not necessarily "close" to the local server according to a proximity metric. The proximity metric is chosen based on such factors as geographic distance and the number of IP routing hops. As shown in FIG. 6, an example leaf set 252 is divided into two parts: (1) entries representing the L/2 servers whose Node IDs are numerically closest to, and are larger than the first server's Node ID, and (2) entries representing the L/2 servers whose Node IDs are numerically closest to, and are smaller than the first server's Node ID.

Returning to the discussion of the routing table, each entry in the routing table is indexed by the Node ID of the server that it represents, and contains the IP address of the server as well. Each server represented in a routing table is potentially one of many servers that share the appropriate prefix digits with the local server. In principal, any server whose Node ID matches the local server's Node ID for the appropriate number of prefix digits can be used in the routing table. In practice, however, to be chosen for entry into the routing table, a server is required to be sufficiently "close," according to the proximity metric, to the local server.

An example of a procedure that may be carried out by each server in a network to route messages to other servers in an embodiment of the invention is shown in pseudo code form in Table 1. The procedure is executed whenever a message with key number D arrives at a server (referred to again as the "local server") with a Node ID of A.

TABLE 1

$R^i_1$: the entry in the routing table R at column i, $0 \leq i < 2^b$ and row l, $0 \leq l < [128/b]$.
$L_i$: the i-th closest Node ID in the leaf set L, $- [|L|/2] \leq i \leq [|L|/2]$, where negative/positive indices indicate Node IDs smaller/larger than the present Node ID, respectively.
D(l): the value of the lth digit in the key D.
shl(A, D): the length of the prefix shared among A and D, in digits.
(1)    if $(L_{-[|L|/2]} \leq D \leq L_{[|L|/2]})${
(2)    //D is within range of our leaf set
(3)    forward to $L_i$, s.th.|D–$L_i$|is minimal;
(4)    } else {
(5)    // use the routing table
(6)    Let l = shl(D, A);
(7)    if ($R_l^{D(l)} \neq$ null) {
(8)    forward to $R_l^{D(l)}$;
(9)    }
(10)    else{
(11)    // rare case
(12)    forward to $T \in L \cup R$, s.th.
(13)    shl(T, D) $\geq$ l,
(14)    |T – D| < |A – D|
(15)    }
(16)    }

Given a message, the local server first checks to see if the key number falls within the range of Node IDs covered by its leaf set (line 1). If so, the message is forwarded directly to the destination server, namely the server in the leaf set whose Node ID is closest to the key (possibly the local server) (line 3).

If the key number is not covered by the leaf set, then the routing table is used and the message is forwarded to a server that shares a common prefix with the key number by at least one more digit than the local server (lines 6-8). In certain cases, it is possible that the approximate entry in the routing table is empty or the associated server is not reachable (line 11-14), in which case the message is forwarded to a server that shares a prefix with the key number that is at least as long as that shared with the local server, and is numerically closer to the key number than the Node ID of the local server. Such a server should be in the union of the leaf set and routing table unless the message has already arrived at the server with numerically closest Node ID. And, unless [|L|2] adjacent servers in the leaf set have failed simultaneously, at least one of those servers should be alive.

The routing procedure described in Table 1 normally converges, because each step takes the message to a server whose Node ID either (1) shares a longer prefix with the key number than that of the local server, or (2) shares as long a prefix with, but is numerically closer to the key number than that of the local server.

It can thus be seen that a new a useful method and system for managing data records on a computer network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. In an overlay network, a method for managing a data record, the method comprising:
   organizing a plurality of servers of the overlay network into a tree, wherein any one of the plurality of servers is capable of maintaining a master copy of the data record and representing a root of the tree, wherein each of the other servers of the plurality of servers maintains a copy of the data record, wherein the plurality of servers transmits updates to one another based on the tree, the tree comprising a plurality of edges, each edge defining a path for updates to the data record between a pair of the plurality of servers;
   determining whether a first server is receiving requests for information contained in the data record at an excessive request rate, the first server being in the plurality of servers that comprise the tree; and
   in response to determining that requests for information contained in the data record are being received at an excessive request rate, transmitting an additional copy of the data record to a second server that did not previously have a copy of the data record, thereby adding the second server to the tree.

2. A computer-readable storage medium having stored thereon computer-executable instructions that, when executed by a computing device, perform the method of claim 1.

3. The method of claim 1, further comprising:
   at the first server:
   receiving notification of a change in the record; and
   transmitting information regarding the change from the first server to the second server.

4. The method of claim 3, further comprising, at the second server, updating the additional copy of the record to reflect the information received from the first server.

5. The method of claim 4, wherein the determining step comprises determining whether the first server has received an excessive number of requests over a defined period of time.

6. The method of claim 1, wherein the determining step comprises determining whether the first server has received an excessive number of requests over a defined period of time.

7. The method of claim 1, wherein the plurality of servers is a subset of all of the servers of the network, and wherein each server of the network has a node ID, the method further comprising:
- at a server of the plurality of servers, receiving a request for information contained in the data record;
- forwarding the request to another server of the network along with a key number, the key number being mathematically derived from the name of the record that is the subject of the request;
- at each server of the network that receives a forwarded request, determining whether there is at least one other server whose node ID is closer in value to the key number than the node ID of the server that received the request; and
- if it is determined that there is at least one other server whose node ID is closer in value to the key number than the node ID of the server that received the request, transmitting the request to the other server.

8. The method of claim 1, further comprising, at the second server, servicing a request for a lookup of a network name using the received copy of the data record.

9. The method of claim 1, wherein the data record is a directory that includes a plurality of network name records, each network name record comprising information associated with a name of a node on the network.

10. The method of claim 9, wherein the information associated with the name of the node on the network comprises the IP address of the node.

11. The method of claim 9, wherein the directory represents an informational topic, and wherein the node maintains information that relates to the informational topic.

12. The method of claim 1, further comprising:
- at one of the plurality of servers, receiving, from a client computer of an underlying network independent of the overlay network, a request for information contained in the data record; and
- transmitting a response to the request to the client computer through the underlying network.

13. A computerized system for managing a data record comprising an overlay network, the overlay network comprising a plurality of servers, the plurality of servers comprising:
- a first server including a processing unit and a memory, the first server configured to, at least:
  - participate in a tree for propagating data records;
  - maintain a first copy of the data record;
  - receive requests for information contained in the data record;
  - determine that the requests are being received at an excessive request rate;
  - in response to determining that requests for information contained in the data record are being received at an excessive request rate, add a second server to the tree for propagating data records; and
  - transmit an additional copy of the data record to the second server; and
- the second server including a processing unit and a memory, the second server configured to, at least:
  - participate in at least one tree for propagating data records;
  - receive at least one of a plurality of copies of the data record; and
  - maintain the at least one of the plurality of copies of the data record.

14. The system of claim 13, wherein:
- the first server is further configured to, at least:
  - receive notification of a change to the data record; and
  - transmit information regarding the change to the second server; and
- the second server is further configured to, at least:
  - receive information regarding the change to the data record; and
  - update the at least one of the plurality of copies of the data record.

15. The system of claim 13, wherein each of the plurality of servers in the overlay network is further configured to, at least:
- maintain a node ID;
- calculate a cryptographic hash of a name of the data record; and
- determine a logical distance between the cryptographic hash and the node ID of at least one of the plurality of servers in the overlay network.

16. The system of claim 13, wherein the second server is further configured to, at least, service a request for a lookup of a network name using the at least one of the plurality of copies of the data record.

17. The system of claim 13, wherein the data record is a directory that includes a plurality of network name records, each network name record comprising information associated with a name of a node on the network.

18. A computerized system for managing a data record comprising a server including a processing unit and a memory, the server configured to, at least:
- participate in an overlay network;
- participate in a tree for propagating data records;
- maintain a first copy of the data record;
- receive requests for information contained in the data record;
- determine that the requests are being received at an excessive request rate;
- in response to determining that requests for information contained in the data record are being received at an excessive request rate, add a further server participating in the overlay network to the tree for propagating data records; and
- transmit an additional copy of the data record to the further server.

19. The system of claim 18, wherein each server participating in the overlay network is further configured to, at least:
- maintain a node ID;
- calculate a cryptographic hash of a name of the data record; and
- determine a logical distance between the cryptographic hash and the node ID of at least one server participating in the overlay network.

20. The system of claim 18, wherein the data record is a directory that includes a plurality of network name records, each network name record comprising information associated with a name of a node on the network.

* * * * *